United States Patent
Jimbo

(10) Patent No.: US 9,582,227 B2
(45) Date of Patent: Feb. 28, 2017

(54) PRINTER CONTROL APPARATUS, PRINTING CONTROL METHOD, AND PRINTING CONTROL SYSTEM FOR TRANSMITTING A RECEPTION REQUEST SIGNAL AND ADJUSTING A TRANSMISSION INTERVAL OF A TRANSMISSION REQUEST SIGNAL

(71) Applicant: Seiko Instruments Inc., Chiba-shi, Chiba (JP)

(72) Inventor: Seiichi Jimbo, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 15/006,475

(22) Filed: Jan. 26, 2016

(65) Prior Publication Data

US 2016/0224285 A1  Aug. 4, 2016

(30) Foreign Application Priority Data

Jan. 30, 2015 (JP) .................................. 2015-017469

(51) Int. Cl.
- *G06F 15/00* (2006.01)
- *G06F 3/12* (2006.01)
- *G06K 1/00* (2006.01)

(52) U.S. Cl.
CPC .......... *G06F 3/1211* (2013.01); *G06F 3/1236* (2013.01); *G06F 3/1284* (2013.01)

(58) Field of Classification Search
CPC .... G06F 3/1232; G06F 3/1204; G06F 3/1263; G06F 3/1287

USPC ......................................... 358/1.1, 1.15, 1.14
See application file for complete search history.

(56) References Cited

U.S. PATENT DOCUMENTS

| | | | | |
|---|---|---|---|---|
| 2001/0013948 A1* | 8/2001 | Fujiwara | ................ | B41J 29/393 358/1.15 |
| 2009/0201547 A1* | 8/2009 | Noguchi | ................ | H04L 12/66 358/1.15 |
| 2014/0280782 A1* | 9/2014 | Ohara | ..................... | H04L 67/28 709/219 |
| 2015/0309996 A1* | 10/2015 | Han | ................... | G06K 9/00442 704/2 |

FOREIGN PATENT DOCUMENTS

JP    2013-045354 A    3/2013

\* cited by examiner

*Primary Examiner* — Douglas Tran
(74) *Attorney, Agent, or Firm* — Brinks Gilson & Lione

(57) ABSTRACT

A printing control system, including a printer control apparatus and a host control apparatus, the printer control apparatus including: a first communication unit configured to transmit to the host control apparatus a reception request signal, which is for prompting the host control apparatus to transmit a transmission request signal; and a second communication unit configured to transmit data to the host control apparatus when receiving the transmission request signal, the host control apparatus including: a third communication unit configured to receive the reception request signal; and a fourth communication unit configured to, when receiving the reception request signal, transmit the transmission request signal, which is for prompting the printer control apparatus to transmit the data.

6 Claims, 10 Drawing Sheets

PRINTER CONTROL APPARATUS, PRINTING CONTROL METHOD, AND PRINTING CONTROL SYSTEM FOR TRANSMITTING A RECEPTION REQUEST SIGNAL AND ADJUSTING A TRANSMISSION INTERVAL OF A TRANSMISSION REQUEST SIGNAL

RELATED APPLICATIONS

This application claims priority under 35 U.S.C. §119 to Japanese Patent Application No. 2015-017469 filed on Jan. 30, 2015, the entire content of which is hereby incorporated by reference.

BACKGROUND OF THE INVENTION

1. Field of the Invention

The present invention relates to a printer control apparatus, a printing control method, and a printing control system.

2. Description of the Related Art

There have been known printing control systems in which a host-side control apparatus and a printer-side control apparatus are connected by a Universal Serial Bus (USB) interface.

In such printing control systems, communication between a host (a host control apparatus) and a device (a device control apparatus) that have a master-slave relationship is controlled and, when data is to be transmitted from the device side to the host side, the device side is not allowed to transmit the data to the host side until a transmission request signal from the host side is received on the device side. The host side does not know when data to be transmitted is generated on the device side, and accordingly needs to send a transmission request signal regularly to the device side.

The host side in the systems described above also needs to regularly send a check request signal to the device side in order to check the error status on the device side regularly. Receiving the check request signal, the device side transmits a response signal to the host side.

A known technology of this type is to regularly transmit from a host to a printer apparatus (a device control apparatus) a signal that indicates that the connection between the host and the printer apparatus is in a normal state.

However, printing control systems of the related art have a problem in that increasing the frequency of transmission of the signal that is transmitted regularly from the host slows down the overall communication speed of the system. Decreasing the frequency of transmission gives rise to an opposite problem in that the amount of data waiting to be transmitted builds up, which causes troubles such as a loss of data to be transmitted from the device and the shutting down of the device.

For those reasons, a printer control apparatus, a printing control method, and a printing control system that are capable of improving the overall communication efficiency of a system have been waited for in the technical field of the present invention.

SUMMARY OF THE INVENTION

According to one embodiment of the present invention, there is provided a printer control apparatus, including: a first communication unit configured to transmit to a host control apparatus a reception request signal, which is for prompting the host control apparatus to transmit a transmission request signal; and a second communication unit configured to transmit data to the host control apparatus when receiving the transmission request signal.

In the printer control apparatus according to the one embodiment of the present invention, the first communication unit transmits the reception request signal to the host control apparatus only when the data that is high in priority is to be transmitted to the host control apparatus.

In the printer control apparatus according to the one embodiment of the present invention, the reception request signal indicates a priority level of the data, and the second communication unit transmits to the host control apparatus the data that has the priority level indicated by the reception request signal.

According to another embodiment of the present invention, there is provided a printing control method to be used in a printer control apparatus, the printing control method including: transmitting, from the printer control apparatus to a host control apparatus, a reception request signal, which is for prompting the host control apparatus to transmit a transmission request signal; and transmitting data to the host control apparatus when the printer control apparatus receives the transmission request signal.

According to still another embodiment of the present invention, there is provided a printing control system, including a printer control apparatus and a host control apparatus, the printer control apparatus including: a first communication unit configured to transmit to the host control apparatus a reception request signal, which is for prompting the host control apparatus to transmit a transmission request signal; and a second communication unit configured to transmit data to the host control apparatus when receiving the transmission request signal, the host control apparatus including: a third communication unit configured to receive the reception request signal; and a fourth communication unit configured to, when receiving the reception request signal, transmit the transmission request signal, which is for prompting the printer control apparatus to transmit the data.

The printer control apparatus, the printing control method, and the printing control system according to the described embodiments of the present invention may improve the overall communication efficiency of a system.

DETAILED DESCRIPTION OF THE PREFERRED EMBODIMENTS

An embodiment of the present invention is described with reference to the drawings.

Figure 1:
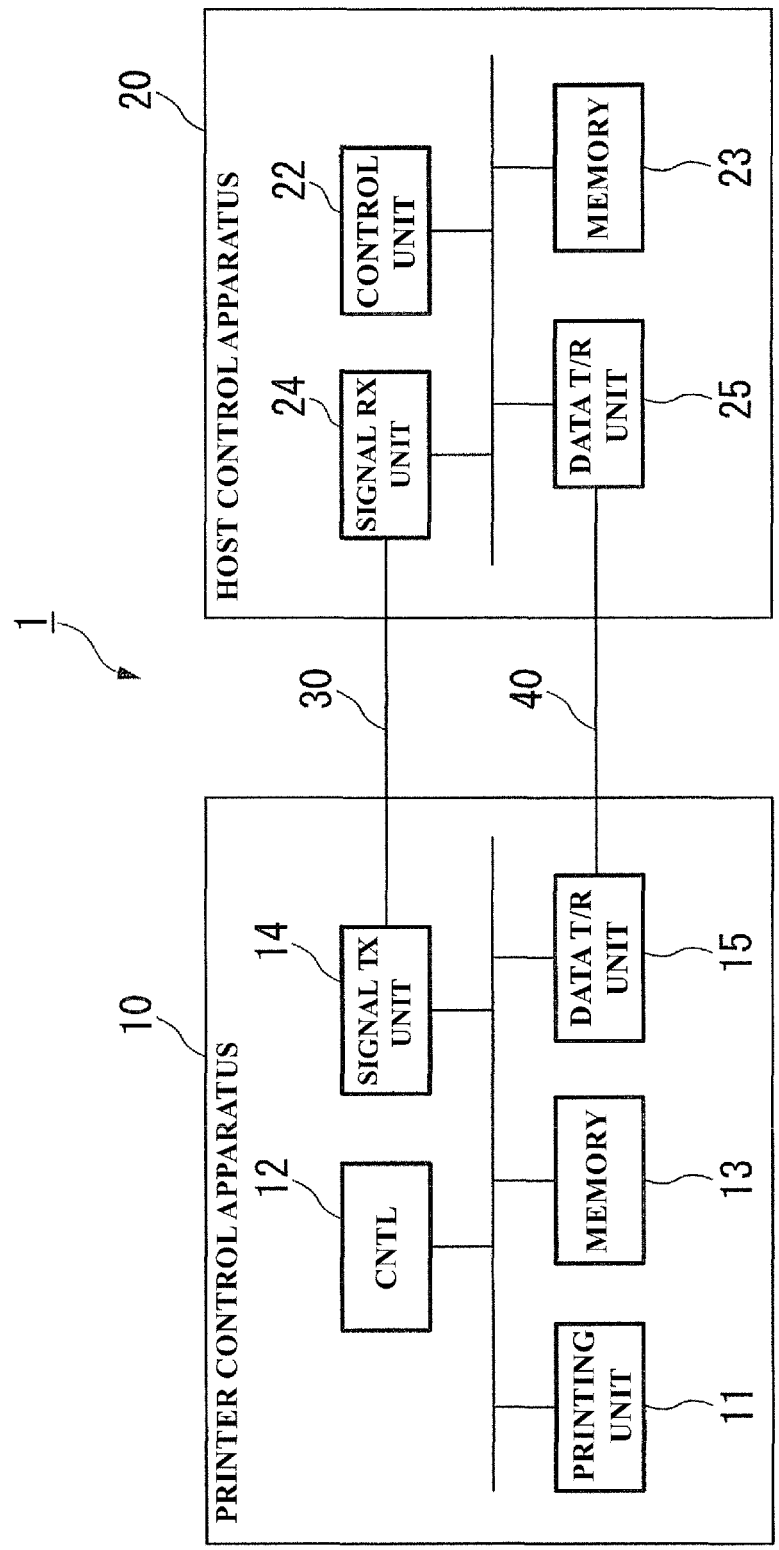
FIG. 1 is a block diagram for illustrating an example of the configuration of a printing control system according to an embodiment of the present invention.

FIG. 1 is a block diagram for illustrating an example of the configuration of a printing control system according to the embodiment of the present invention. A printing control system 1 according to this embodiment includes a printer control apparatus 10, a host control apparatus 20, a first communication line 30, and a second communication line 40.

The printer control apparatus 10 is connected to the host control apparatus 20 by the first communication line 30 and the second communication line 40. The printer control apparatus 10 is an apparatus configured to control a printer apparatus such as an ink jet printer, a laser printer, or a thermal printer. The printer control apparatus 10 includes a printing unit 11, a controller 12, a memory 13, a signal transmitting unit 14 (a first communication unit), and a data transmitting/receiving unit 15 (a second communication unit).

The printing unit 11 executes printing following a command from the controller 12. The controller 12 executes various types of control of the printer control apparatus 10. The controller 12 is, for example, a central processing unit (CPU).

The memory 13 stores various types of data and programs. The memory 13 stores, for example, various types of data received from the host control apparatus 20, such as printing data, and various types of data to be transmitted to the host control apparatus 20. The memory 13 also stores application software for controlling the printer control apparatus 10. Another use of the memory 13 is as a temporary storage area for executing the application software.

The signal transmitting unit 14 connects for communication to the host control apparatus 20 via the first communication line 30. When data to be transmitted from the printer control apparatus 10 to the host control apparatus 20 is generated, the signal transmitting unit 14 transmits a reception request signal to the host control apparatus 20.

The reception request signal is a signal with which the printer control apparatus 10 requests the host control apparatus 20 to send a transmission request signal from the host control apparatus 20 to the printer control apparatus 10. The transmission request signal is a signal with which, when transmission data that needs to be transmitted from the printer control apparatus 10 to the host control apparatus 20 is present in the printer control apparatus 10, the host control apparatus 20 requests the printer control apparatus 10 to send this transmission data from the printer control apparatus 10 to the host control apparatus 20.

In a printing control system as the one described in this embodiment, communication between a host (for example, the host control apparatus 20) and a device (for example, the printer control apparatus 10) that have a master-slave relationship is controlled and, when data is to be transmitted from the device side to the host side, the device side is not allowed to transmit the data to the host side until the transmission request signal from the host side is received on the device side. The host side does not know when data to be transmitted is generated on the device side, and accordingly needs to send the transmission request signal regularly to the device side.

The data transmitting/receiving unit 15 connects for communication to the host control apparatus 20 via the second communication line 40. The data transmitting/receiving unit 15 receives printing data and the transmission request signal from the host control apparatus 20, and transmits various types of data to the host control apparatus 20.

The host control apparatus 20 is connected to the printer control apparatus 10 by the first communication line 30 and the second communication line 40. The host control apparatus 20 is an apparatus configured to control a host such as a personal computer, a printer server, or an information terminal of one of various types. The host control apparatus 20 includes a control unit 22, a memory 23, a signal receiving unit 24 (a third communication unit), and a data transmitting/receiving unit 25 (a fourth communication unit). The control unit 22 executes various types of control in the host control apparatus 20.

The memory 23 stores various types of data and programs. The memory 23 stores, for example, various types of data received from the printer control apparatus 10, and printing data and various other types of data to be transmitted to the printer control apparatus 10. The memory 23 further stores various types of application software for controlling the host control apparatus 20, and a printer driver and application software for causing the printer control apparatus 10 to execute printing and other kinds of operation. Another use of the memory 23 is as a temporary storage area for executing those pieces of application software.

The signal receiving unit 24 connects for communication to the printer control apparatus 10 via the first communication line 30. The signal receiving unit 24 receives the reception request signal transmitted from the signal transmitting unit 14 of the printer control apparatus 10.

The data transmitting/receiving unit 25 connects for communication to the printer control apparatus 10 via the second communication line 40. The data transmitting/receiving unit 25 transmits printing data and the transmission request signal to the printer control apparatus 10, and receives various types of data from the printer control apparatus 10.

The first communication line 30 is a communication line that connects the signal transmitting unit 14 of the printer control apparatus 10 and the signal receiving unit 24 of the host control apparatus 20.

The second communication line 40 is a communication line that connects the data transmitting/receiving unit 15 of the printer control apparatus 10 and the data transmitting/receiving unit 25 of the host control apparatus 20. The second communication line 40 is a data transmission path that connects the printer control apparatus 10 and the host control apparatus 20 by, for example, a Universal Serial Bus (USB) cable.

Figure 2:
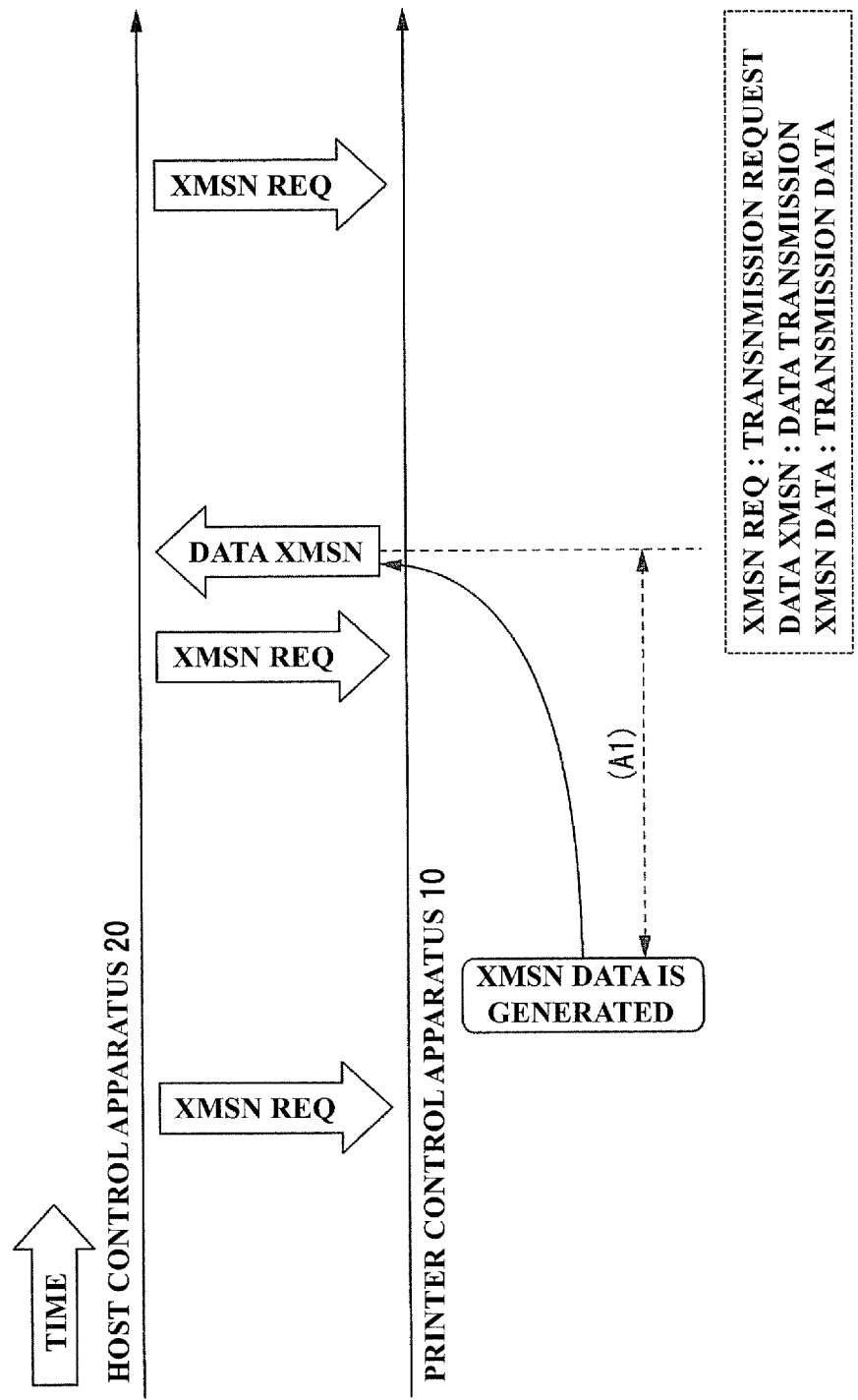
FIG. 2 is a sequence diagram for illustrating an example of the basic operation of a printing control system of the related art.

Before a description is given on the operation of the printing control system 1 according to this embodiment, the operation and problems of a printing control system of the related art are described first. FIG. 2 is a sequence diagram for illustrating an example of the basic operation of the printing control system of the related art.

Time flows from the left-hand side of FIG. 2 to the right-hand side of FIG. 2. Operation steps are described in order from the left-hand side of FIG. 2. First, the host control apparatus 20 transmits the transmission request signal to the printer control apparatus 10. The transmission request signal is a signal that is transmitted in order for the host control apparatus 20 to check with the printer control apparatus 10 whether or not there is transmission data to be transmitted from the printer control apparatus 10 to the host control apparatus 20. The host control apparatus 20 sends the transmission request signal to the printer control apparatus 10 at regular intervals. The transmission request signal is transmitted three times in the time frame of FIG. 2.

In the case where transmission data to be transmitted to the host control apparatus 20 is generated in the printer control apparatus 10, the printer control apparatus 10 waits for the reception of the transmission request signal sent from the host control apparatus 20. Examples of transmission data to be transmitted from the printer control apparatus 10 to the host control apparatus 20 include data that indicates a message notifying the completion of printing, data that indicates a message notifying that printing paper has run out, data that indicates a message alerting to the using up of ink, toner, heat sensitive paper, or the like, data that indicates a message alerting to the fact that a front cover of the printer is open, data that indicates a message alerting to a paper jam inside the printer, data that indicates a message alerting to the exceeding of a regulation value for the temperature inside the printer, and data that indicates a message alerting to an excess/shortage of voltage applied to a circuit of the printer.

When receiving the transmission request signal sent from the host control apparatus 20, the printer control apparatus 10 transmits the transmission data described above to the host control apparatus 20. As described, the printing control system of the related art does not allow the printer control apparatus 10 in which the transmission data has been generated to transmit the transmission data to the host control apparatus 20 until the transmission request signal sent regularly from the host control apparatus 20 is received. A waiting time indicated by the broken line (A1) in FIG. 2 is consequently created in a period from the generation of the transmission data to the actual transmission of the transmission data. The printing control system of the related art therefore has a problem in that even urgent messages to be transmitted to the host control apparatus 20, such as one alerting to an anomaly in the printer, cannot be transmitted immediately.

Figure 3:
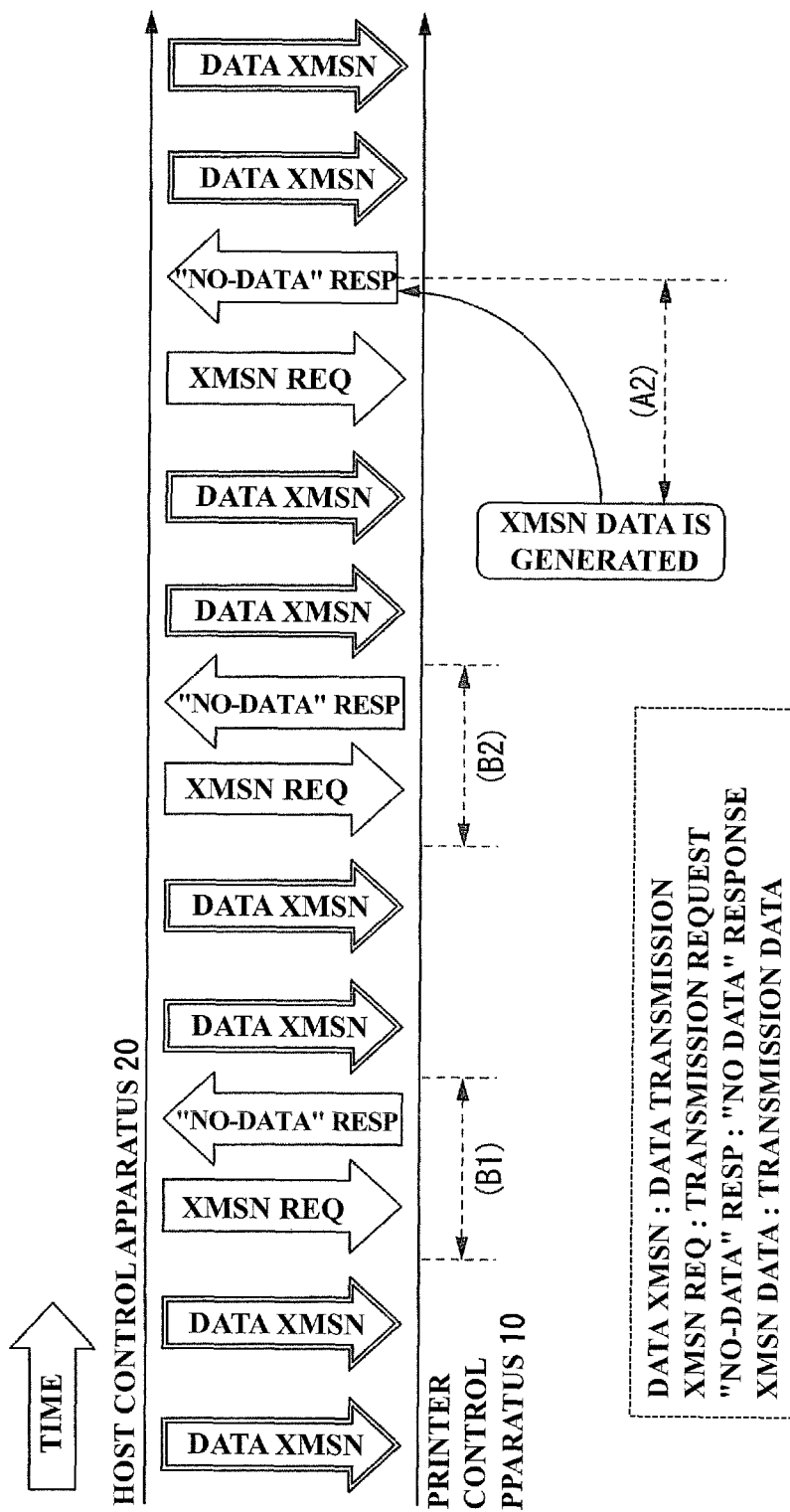
FIG. 3 is a sequence diagram for illustrating an example of how the printing control system of the related art operates when the transmission interval of a transmission request signal is short.

A possible way to cut the waiting time described above is setting a short transmission interval for the transmission request signal sent from the host control apparatus 20 to the printer control apparatus 10. FIG. 3 is a sequence diagram for illustrating an example of how the printing control system of the related art operates when the transmission interval of the transmission request signal is short.

Time flows from the left-hand side of FIG. 3 to the right-hand side of FIG. 3 as in FIG. 2. Data transmitted from the host control apparatus 20 to the printer control apparatus 10 in "data transmission" in FIG. 3 is mainly printing data. The host control apparatus 20 regularly interrupts the transmission of printing data in order to send the transmission request signal to the printer control apparatus 10.

As illustrated, because the transmission interval of the transmission request signal sent from the host control apparatus 20 to the printer control apparatus 10 is short, the printer control apparatus 10 in which the transmission data has been generated transmits the data to the host control apparatus 20 after a waiting time that is indicated by the broken line (A2) in FIG. 3. The waiting time indicated by the broken line (A2) in FIG. 3 is shorter than the waiting time indicated by the broken line (A1) in FIG. 2.

However, the short transmission interval of the transmission request signal increases cases in which the host control apparatus 20 sends the transmission request signal to the printer control apparatus 10 when there is no transmission data in the printer control apparatus 10. In other words, the short transmission interval increases the proportion of time spent on exchanges in which the host control apparatus 20 sends the transmission request signal and the printer control apparatus 10 notifies in response to the request that there is no transmission message, as indicated by the broken line (B1) and the broken line (B2) in FIG. 3. Setting a short transmission interval for the transmission request signal sent from the host control apparatus 20 to the printer control apparatus 10 in the printing control system of the related art accordingly results in a drop in the overall communication speed of the system.

Figure 4:
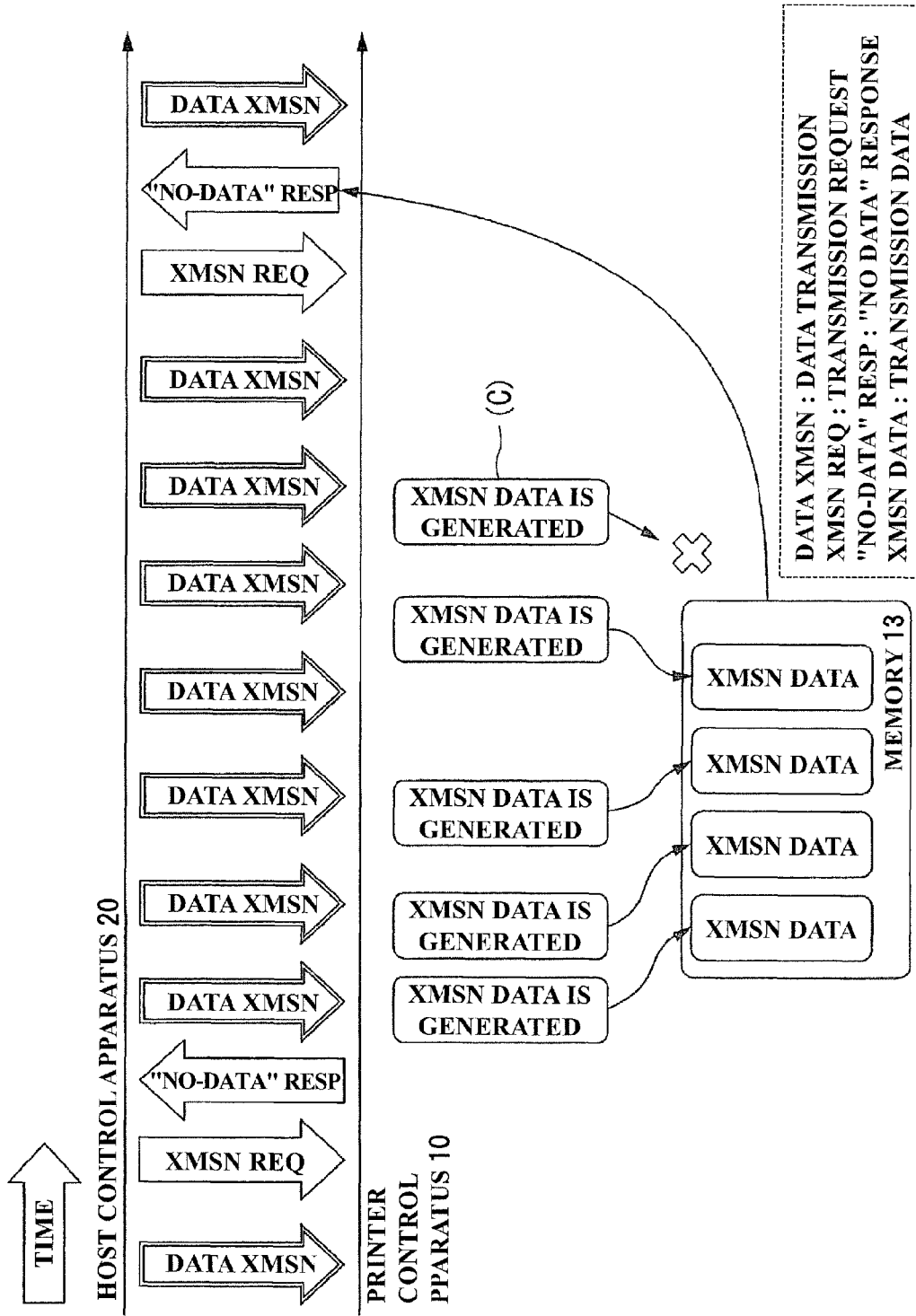
FIG. 4 is a sequence diagram for illustrating an example of how the printing control system of the related art operates when the transmission interval of a transmission request signal is long.

Considered next is a case in which the transmission interval of the transmission request signal sent from the host control apparatus 20 to the printer control apparatus 10 is long in order to reduce the proportion of the time that is spent on the transmission of and response to the transmission request signal as described above. FIG. 4 is a sequence diagram for illustrating an example of how the printing control system of the related art operates when the transmission interval of a transmission request signal is long.

Time flows from the left-hand side of FIG. 4 to the right-hand side of FIG. 4 as in FIG. 2 and FIG. 3. Data transmitted from the host control apparatus 20 to the printer control apparatus 10 in "data transmission" in FIG. 4 is mainly printing data as in FIG. 3. The host control apparatus 20 regularly interrupts the transmission of printing data in order to send the transmission request signal to the printer control apparatus 10.

As illustrated in FIG. 4, setting a long transmission interval for the transmission request signal sent from the host control apparatus 20 to the printer control apparatus 10 lengthens the time that passes since the transmission of the transmission request signal from the host control apparatus 20 to the printer control apparatus 10 until the next transmission of the transmission request signal. Consequently, a situation in which a plurality of pieces of transmission data are generated in the printer control apparatus 10 before the printer control apparatus 10 receives the next transmission request signal and need to wait to be transmitted arises more frequently. The pieces of transmission data generated and waiting to be transmitted are stored in the memory 13, which is used as a temporary storage area, in chronological order of generation.

In the case where the amount of transmission data generated exceeds the limit of the capacity of the memory 13 to temporarily store the transmission data, however, the printer control apparatus 10 cannot store all of the transmission data and some pieces of the transmission data can be lost.

The amount of transmission data that the memory 13 can temporarily store is four pieces in the example of FIG. 4. In the case where the fifth transmission data indicated by (C) in FIG. 4 is generated after the printer control apparatus 10 receives the transmission request signal and before the next transmission request signal is received, the memory 13 therefore cannot store this transmission data. The transmission data indicated by (C) in FIG. 4 is consequently not transmitted to the host control apparatus 20 and is lost.

As described, setting a long transmission interval for the transmission request signal in the printing control system of the related art leads to a processing waiting time that is longer than when the transmission interval is short, and gives rise to a problem in that some pieces of the transmission data are lost when the memory 13 overflows. In addition, even urgent messages to be transmitted to the host control apparatus 20, such as one alerting to an anomaly in the printer, cannot be transmitted immediately as described above with reference to FIG. 2. The inability to promptly send a message to the host control apparatus 20 from the printer control apparatus 10 means that, when the printer control apparatus 10 runs out of printing paper, for example, processing of stopping printing cannot be executed immediately.

Figure 5:
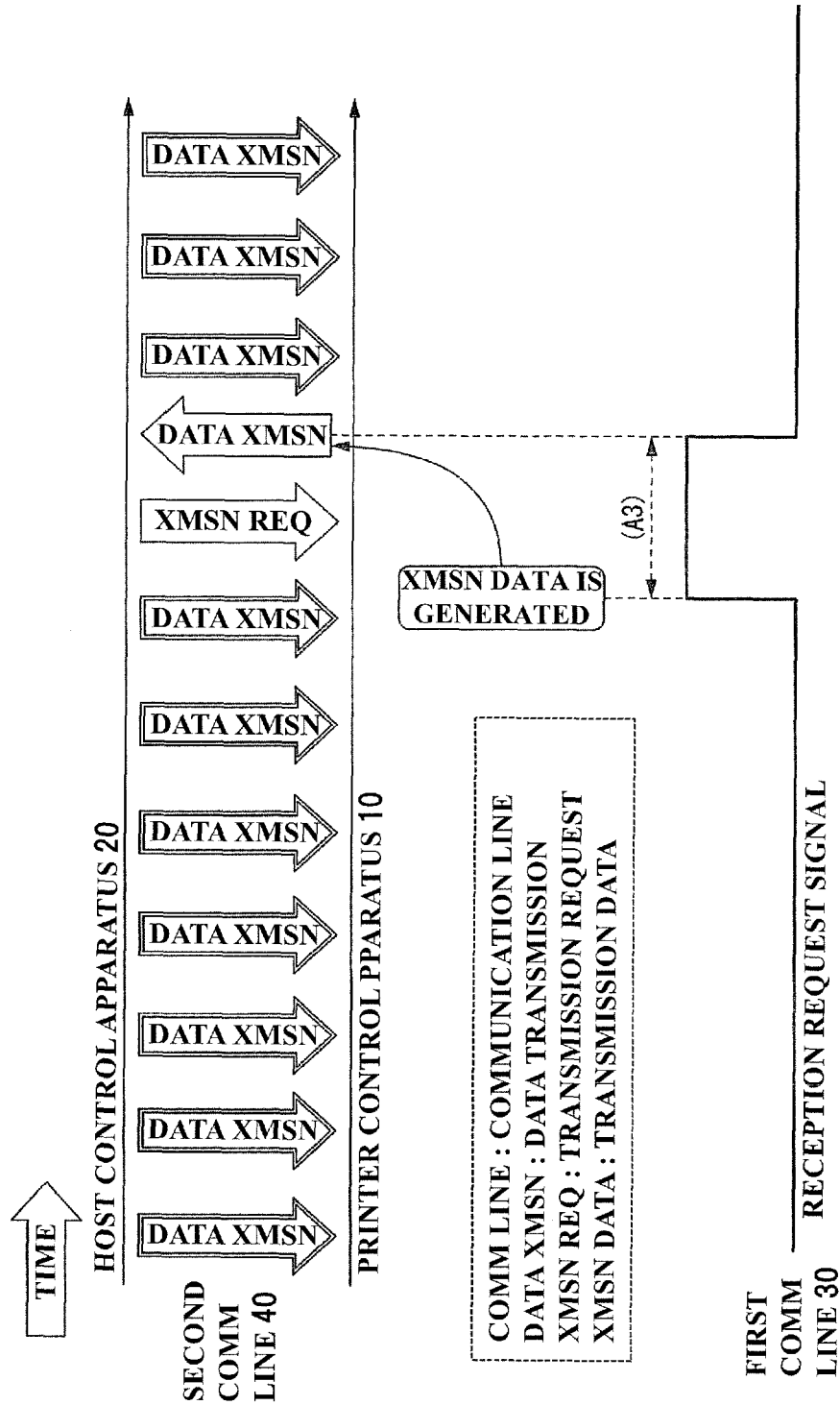
FIG. 5 is a sequence diagram for illustrating an example of the operation of the printing control system according to the embodiment of the present invention.

The present invention has been made in view of those problems of the related art. The operation of the printing control system according to the embodiment of the present invention is described below. FIG. 5 is a sequence diagram for illustrating an example of the operation of the printing control system according to the embodiment of the present invention.

This embodiment uses the first communication line 30 through which the reception request signal is transmitted from the printer control apparatus 10 to the host control apparatus 20, in addition to the second communication line 40 through which data, the transmission request signal, and the like are exchanged between the host control apparatus 20 and the printer control apparatus 10. The reception request signal is a signal with which the printer control apparatus 10 requests the host control apparatus 20 to send the transmission request signal from the host control apparatus 20 to the printer control apparatus 10.

Unlike the related art, the host control apparatus 20 does not send the transmission request signal to the printer control apparatus 10 regularly in the embodiment of the present invention. The host control apparatus 20 sends the transmission request signal to the printer control apparatus 10 only when the reception request signal is received from the printer control apparatus 10 through the first communication line 30.

The printer control apparatus 10 transmits the reception request signal to the host control apparatus 20 through the first communication line 30 when the transmission data is generated. In the example of FIG. 5, the reception request signal is a digital signal that takes one of two values indicative of two states, "high" and "low", depending on the voltage level. When the voltage level is at the high level, the reception request signal is "high", which indicates that the printer control apparatus 10 is transmitting the reception request signal to the host control apparatus 20. The reception request signal in the example of FIG. 5 is "high" for the duration of a time (A3) and is "low" for the rest of the time.

The host control apparatus 20 receives the reception request signal transmitted from the printer control apparatus 10 through the first communication line 30, and then sends the transmission request signal to the printer control apparatus 10 through the second communication line 40. Receiving the transmission request signal sent from the host control apparatus 20, the printer control apparatus 10 transmits the transmission data to the host control apparatus 20 through the second communication line 40. The printer control apparatus 10 subsequently returns the reception request signal to "low", that is, ends the transmission of the reception request signal that has been transmitted to the host control apparatus 20 through the first communication line 30.

Figure 6:
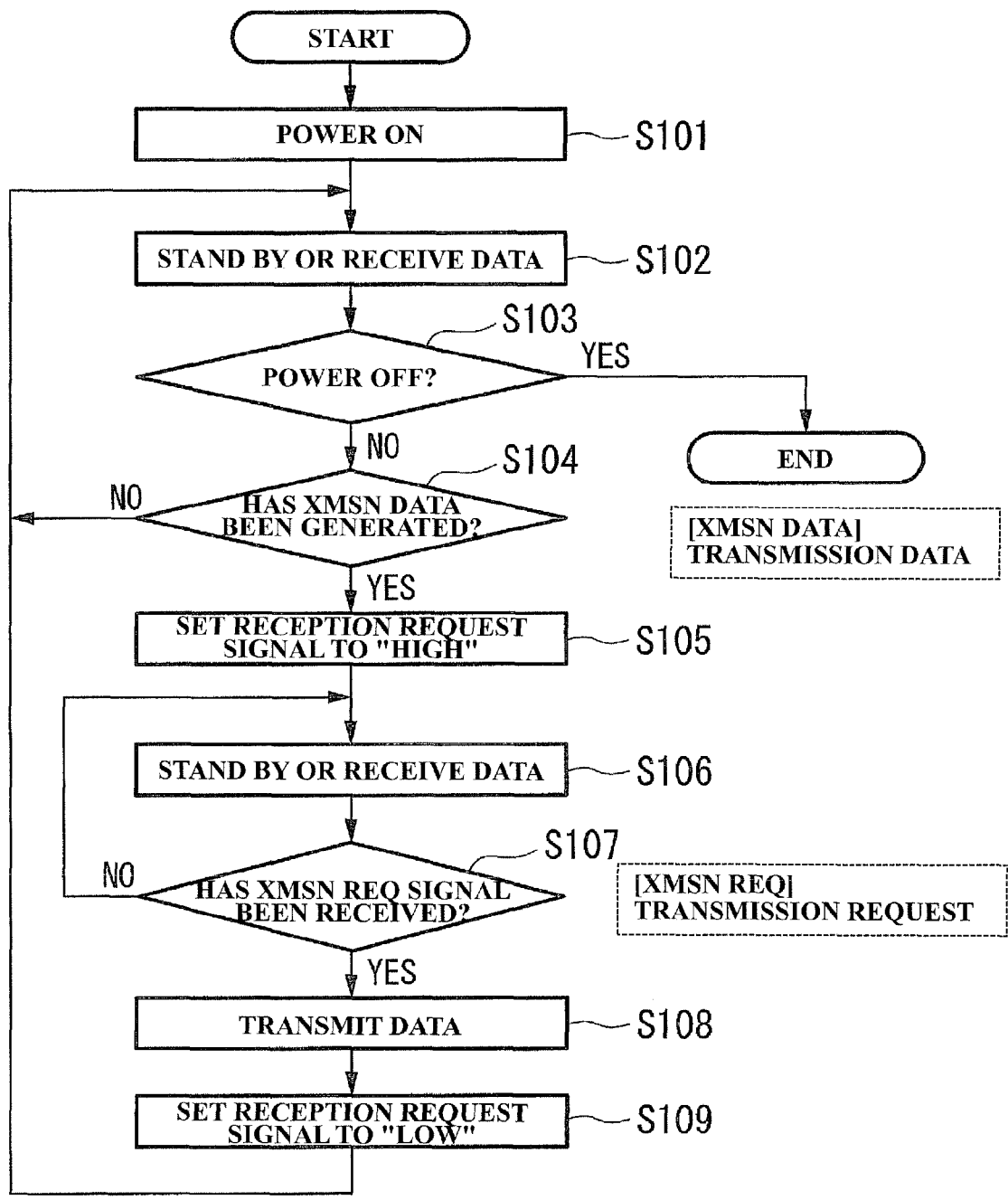
FIG. 6 is a flow chart for illustrating an example of the operation of a printer control apparatus according to the embodiment of the present invention.

The operation of the printer control apparatus 10 according to the embodiment of the present invention is described below. FIG. 6 is a flow chart for illustrating an example of the operation of the printer control apparatus according to the embodiment of the present invention.

(Step S101) First, a printer apparatus including the printer control apparatus 10 is powered on by a user or the like of the printer apparatus. The printer control apparatus 10 then proceeds to Step S102.

(Step S102) The printer control apparatus 10 stands by to wait for data transmitted from the host control apparatus 20. Alternatively, the data transmitting/receiving unit 15 of the printer control apparatus 10 receives data transmitted from the host control apparatus 20. The data here is, for example, printing data. The printer control apparatus 10 then proceeds to Step S103.

(Step S103) The operation of this flow chart is ended in the case where the printer apparatus including the printer control apparatus 10 is powered off. Otherwise, the printer control apparatus 10 proceeds to Step S104.

(Step S104) The printer control apparatus 10 proceeds to Step S105 in the case where transmission data to be transmitted to the host control apparatus 20 is generated in the printer control apparatus 10. Otherwise, the printer control apparatus 10 returns to Step S102.

(Step S105) The controller 12 of the printer control apparatus 10 sets the reception request signal to "high". In other words, the printer control apparatus 10 transmits the reception request signal to the host control apparatus 20 through the first communication line 30. The printer control apparatus 10 then proceeds to Step S106.

(Step S106) The printer control apparatus 10 stands by to wait for data or the transmission request signal that is transmitted from the host control apparatus 20 through the second communication line 40. Alternatively, the data transmitting/receiving unit 15 of the printer control apparatus 10 receives data transmitted from the data transmitting/receiving unit 25 of the host control apparatus 20. The data here is, for example, printing data. The printer control apparatus 10 then proceeds to Step S107.

(Step S107) The printer control apparatus 10 proceeds to Step S108 in the case where the data transmitting/receiving unit 15 of the printer control apparatus 10 receives the transmission request signal from the data transmitting/receiving unit 25 of the host control apparatus 20 through the second communication line 40. Otherwise, the printer control apparatus 10 returns to Step S106.

(Step S108) The data transmitting/receiving unit 15 of the printer control apparatus 10 transmits the transmission data to the data transmitting/receiving unit 25 of the host control apparatus 20 through the second communication line 40. The printer control apparatus 10 then proceeds to Step S109.

(Step S109) The controller 12 of the printer control apparatus 10 sets the reception request signal to "low". In other words, the printer control apparatus 10 ends the transmission of the reception request signal that has been transmitted by the signal transmitting unit 24 of the printer control apparatus 10 to the signal receiving unit 14 of the host control apparatus 20 through the first communication line 30. The printer control apparatus 10 then returns to Step S102.

As described, the printer control apparatus 10 according to this embodiment includes the signal transmitting unit 14

(the first communication unit) configured to transmit to the host control apparatus 20 the reception request signal for requesting the host control apparatus 20 to send the transmission request signal, and the data transmitting/receiving unit 15 (the second communication unit) configured to transmit data to the host control apparatus 20 when the transmission request signal is received and to receive data transmitted from the host control apparatus 20.

Configured as above, the printer control apparatus 10 according to the embodiment of the present invention transmits the reception request signal to the host control apparatus 20 each time the transmission data is generated in the printer control apparatus 10, thereby requesting the host control apparatus 20 to send the transmission request signal to the printer control apparatus 10. The printer control apparatus 10 is therefore capable of transmitting the transmission data to the host control apparatus 20 after a short waiting time since the generation of the transmission data.

Specifically, the waiting time until the transmission data is transmitted since the generation of the transmission data is as short as a length indicated by the broken line (A3) in FIG. 5. The printing control system 1 according to the embodiment of the present invention is thus capable of immediately transmitting messages, including urgent messages such as one alerting to an anomaly in the printer, to the host control apparatus 20. For example, a message informing that the printer control apparatus 10 has run out of printing paper can be sent promptly from the printer control apparatus 10 to the host control apparatus 20, and processing of stopping printing can be executed immediately as a result.

In addition, the host control apparatus 20 in the printing control system 1 according to the embodiment of the present invention does not send the transmission request signal regularly to the printer control apparatus 10. The host control apparatus 20 sends the transmission request signal to the printer control apparatus 10 only when the transmission data is generated in the printer control apparatus 10, in response to the reception request signal transmitted from the printer control apparatus 10.

The printing control system 1 of this embodiment thus eliminates exchanges in which the host control apparatus 20 sends the transmission request signal even when the transmission data is not generated in the printer control apparatus 10 and the printer control apparatus 10 notifies in response to the request that there is no transmission message. The printing control system 1 according to the embodiment of the present invention is therefore improved in the overall communication speed of the system.

The printing control system 1 according to the embodiment of the present invention where, each time the transmission data is generated in the printer control apparatus 10, the printer control apparatus 10 requests the host control apparatus 20 to send the transmission request signal to the printer control apparatus 10 also eliminates the lengthy processing waiting time. The printing control system 1 according to the embodiment of the present invention is therefore free from the overflowing of the memory 13 which is caused by the generation of a plurality of pieces of transmission data, and from the resultant loss of some pieces of the transmission data.

The printing control system 1 according to the embodiment of the present invention is thus improved in the overall communication efficiency of the system.

In the embodiment of the present invention described above, the printer control apparatus 10 transmits the reception request signal to the host control apparatus 20 when the transmission data is generated in the printer control apparatus 10 irrespective of what information is indicated by the generated data, and transmits the generated transmission data immediately to the host control apparatus 20. However, not all types of transmission data generated in the printer control apparatus 10 contain urgent notification information.

For example, in the example described above, data that indicates a message notifying that printing paper has run out, data that indicates a message alerting to the using up of ink, toner, heat sensitive paper, or the like, data that indicates a message alerting to the fact that a front cover of the printer is open, data that indicates a message alerting to a paper jam inside the printer, data that indicates a message alerting to the exceeding of a regulation value for the temperature inside the printer, data that indicates a message alerting to an excess/shortage of voltage applied to a circuit of the printer, and the like are anomaly-related notification information, which are desired to be transmitted to the host control apparatus 20 immediately in many cases. Data that indicates a message notifying the completion of printing and similar data, on the other hand, are normal-event notification information, which do not always need to be notified immediately.

In a first modification example of the embodiment of the present invention, transmission data is classified into high priority data, which needs to be transmitted immediately to the host control apparatus 20, and low priority data, which does not immediately need to be transmitted to the host control apparatus 20. The first modification example also includes transmitting the transmission request signal from the host control apparatus 20 to the printer control apparatus 10 regularly as in the related art.

The printer control apparatus 10 transmits the reception request signal to the host control apparatus 20 as in the embodiment described above only when the transmission data that is high in priority is generated, to thereby transmit the high priority transmission data immediately. In the case where the transmission data that is low in priority is generated, the printer control apparatus 10 transmits the low priority transmission data to the host control apparatus 20 when receiving the transmission request signal that is sent regularly by the host control apparatus 20 to the printer control apparatus 10.

The transmission interval of the regularly sent transmission request signal is desirably set to a relatively long interval in order to prevent the overall communication speed of the system from dropping.

The printing control system 1 and the printer control apparatus 10 according to the first modification example of the embodiment of the present invention are described below with reference to the drawings. A description on components of the first modification example that are common to the embodiment described above is omitted.

Figure 7:
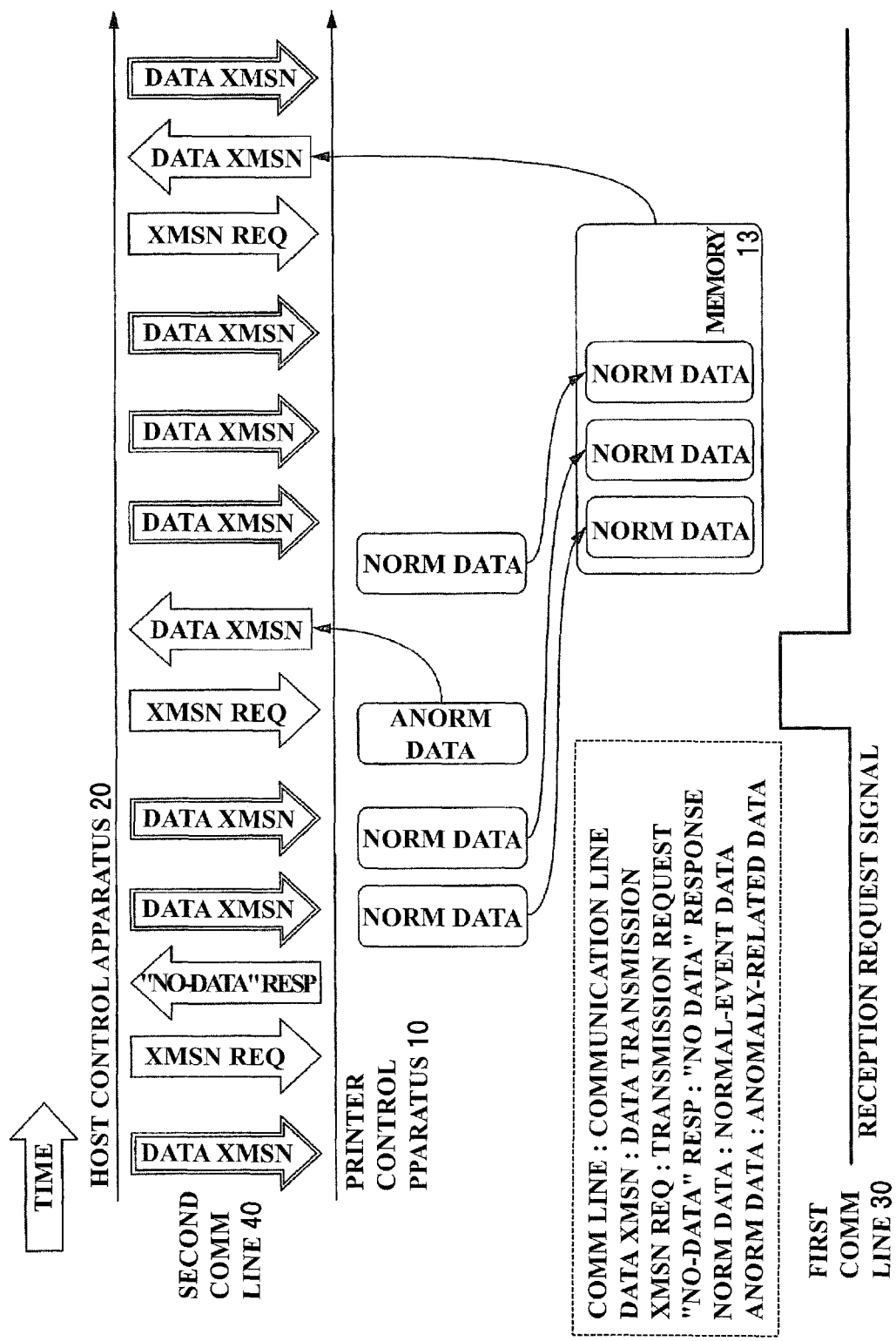
FIG. 7 is a sequence diagram for illustrating an example of the operation of a printing control system according to a first modification example of the embodiment of the present invention.

Described below is the operation of the printing control system according to the first modification example of the embodiment of the present invention. FIG. 7 is a sequence diagram for illustrating an example of the operation of the printing control system according to the first modification example of the embodiment of the present invention. Time flows from the left-hand side of FIG. 7 to the right-hand side of FIG. 7. Operation steps are described below in order from the left-hand side of FIG. 7.

The example of FIG. 7 is a case in which the host control apparatus 20 is executing data transmission to the printer control apparatus 10 through the second communication line 40. The data transmission executed here is, for example, the transmission of printing data. The host control apparatus 20 regularly sends the transmission request signal to the printer control apparatus 10 through the second communication line 40. As illustrated, there is no transmission data in the printer control apparatus 10 at the time the printer control apparatus 10 receives the first transmission request signal within the time frame of FIG. 7. The printer control apparatus 10 accordingly transmits a "no data" response, which indicates that there is no transmission data, to the host control apparatus 20 through the second communication line 40.

Thereafter, transmission data is generated in the printer control apparatus 10 as illustrated in FIG. 7. The first transmission data and the second transmission data are normal-event data, and are therefore stored in the memory 13, which is used as a temporary storage area, instead of being transmitted immediately to the host control apparatus 20. The third transmission data generated in the printer control apparatus 10 is anomaly-related data. The printer control apparatus 10 accordingly transmits the reception request signal to the host control apparatus 20 through the first communication line 30. Receiving the reception request signal, the host control apparatus 20 sends the transmission request signal through the second communication line 40. The printer control apparatus 10 receives this transmission request signal, and transmits the anomaly-related data to the host control apparatus 20 through the second communication line 40. In the manner described above, the printer control apparatus 10 transmits anomaly-related data to the host control apparatus 20 immediately after the anomaly-related data is generated.

At a subsequent point where the printer control apparatus 10 receives the second transmission request signal within the time frame of FIG. 7, there is no anomaly-related data that is waiting to be transmitted but the pieces of normal-event data stored in the memory 13 are waiting to be transmitted. The printer control apparatus 10 reads the earliest stored data among the pieces of normal-event data stored in the memory 13, and transmits the read data to the host control apparatus 20 through the second communication line 40.

As has been described, the printer control apparatus 10 in the first modification example of the embodiment of the present invention transmits the reception request signal to the host control apparatus 20 as in the embodiment described above only when the transmission data that is high in priority is generated, to thereby transmit the high priority transmission data immediately. In the case where the transmission data that is low in priority is generated, the printer control apparatus 10 transmits the low priority transmission data to the host control apparatus 20 when receiving the transmission request signal that is sent regularly by the host control apparatus 20 to the printer control apparatus 10.

Figure 8:
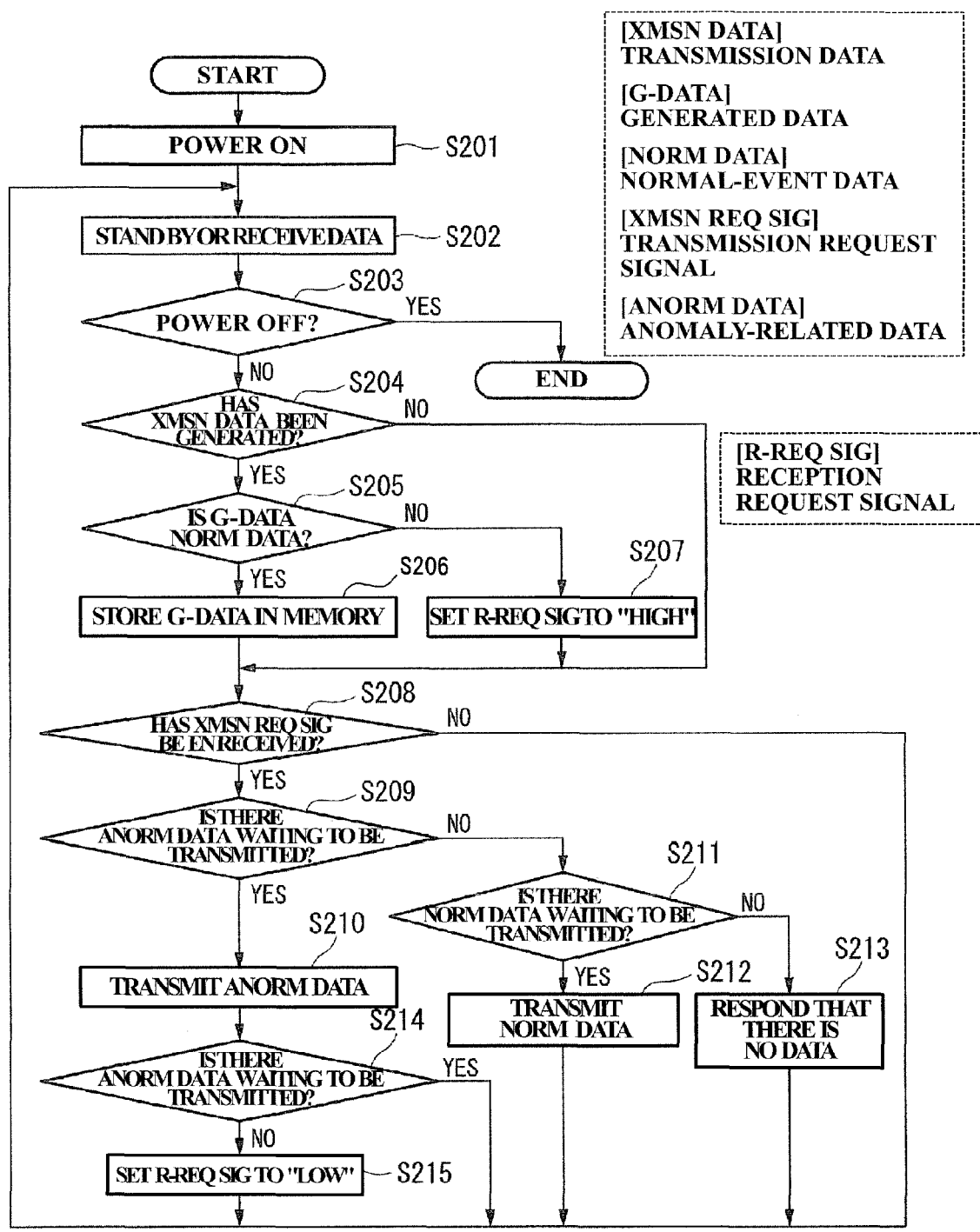
FIG. 8 is a flow chart for illustrating an example of the operation of a printer control apparatus according to the first modification example of the embodiment of the present invention.

The operation of the printer control apparatus 10 according to the first modification example of the embodiment of the present invention is described below. FIG. 8 is a flow chart for illustrating an example of the operation of the printer control apparatus according to the first modification example of the embodiment of the present invention.

(Step S201) First, a printer apparatus including the printer control apparatus 10 is powered on by a user or the like of the printer apparatus. The printer control apparatus 10 then proceeds to Step S202.

(Step S202) The printer control apparatus 10 stands by to wait for data transmitted from the data transmitting/receiving unit 25 of the host control apparatus 20 through the second communication line 40. Alternatively, the data transmitting/receiving unit 15 of the printer control apparatus 10 receives data transmitted from the host control apparatus 20 through the second communication line 40. The data here is, for example, printing data. The printer control apparatus 10 then proceeds to Step S203.

(Step S203) The operation of this flow chart is ended in the case where the printer apparatus including the printer control apparatus 10 is powered off. Otherwise, the printer control apparatus 10 proceeds to Step S204.

(Step S204) The printer control apparatus 10 proceeds to Step S205 in the case where transmission data to be transmitted to the host control apparatus 20 is generated in the printer control apparatus 10. Otherwise, the printer control apparatus 10 proceeds to Step S208.

(Step S205) In the case where the transmission data generated in Step S204 is normal-event data, namely, low priority transmission data, the printer control apparatus 10 proceeds to Step S206. In the case where the generated transmission data is not normal-event data, namely, anomaly-related data, which is high priority transmission data, the printer control apparatus 10 proceeds to Step S207.

(Step S206) The controller 12 of the printer control apparatus 10 stores the normal-event data generated in the previous step in the memory 13, which is used as a temporary storage area. The printer control apparatus 10 then proceeds to Step S208.

(Step S207) The controller 12 of the printer control apparatus 10 sets the reception request signal to "high". In other words, the printer control apparatus 10 transmits the reception request signal to the host control apparatus 20 through the first communication line 30. The printer control apparatus 10 then proceeds to Step S208.

(Step S208) The printer control apparatus 10 proceeds to Step S209 in the case where the data transmitting/receiving unit 15 of the printer control apparatus 10 has received the transmission request signal from the host control apparatus 20. Otherwise, i.e., in the case where the data transmitting/receiving unit 15 of the printer control apparatus 10 has not received the transmission request signal, the printer control apparatus 10 returns to Step S202.

(Step S209) The printer control apparatus 10 proceeds to Step S210 in the case where anomaly-related data is waiting to be transmitted in the printer control apparatus 10. Otherwise, the printer control apparatus 10 proceeds to Step S211.

(Step S210) The printer control apparatus 10 transmits the anomaly-related data to the host control apparatus 20 through the second communication line 40. The printer control apparatus 10 then proceeds to Step S214.

(Step S211) The printer control apparatus 10 proceeds to Step S212 in the case where normal-event data is stored in the memory 13 and is waiting to be transmitted in the printer control apparatus 10. Otherwise, the printer control apparatus 10 proceeds to Step S213.

(Step S212) The controller 12 of the printer control apparatus 10 reads the earliest stored data among the pieces of normal-event data stored in the memory 13. The data transmitting/receiving unit 15 of the printer control apparatus 10 transmits the read normal-event data to the host control apparatus 20 through the second communication line 40. The printer control apparatus 10 then returns to Step S202.

(Step S213) With no transmission data waiting to be transmitted, the signal transmitting unit 14 of the printer control apparatus 10 transmits a "no data" response, which is a signal indicating that there is no data to be transmitted, to the signal receiving unit 24 of the host control apparatus 20 through the second communication line 40. The printer control apparatus 10 then returns to Step S202.

(Step S214) The printer control apparatus 10 returns to Step S202 in the case where there is still anomaly-related data waiting to be transmitted in the printer control apparatus 10. Otherwise, the printer control apparatus 10 proceeds to Step S215.

(Step S215) The controller 12 of the printer control apparatus 10 sets the reception request signal to "low", that is, stops transmitting the reception request signal to the host control apparatus 20 through the first communication line 30. The printer control apparatus 10 then returns to Step S202.

As described, the printer control apparatus 10 according to the first modification example of the embodiment of the present invention includes the signal transmitting unit 14 (the first communication unit) configured to transmit to the host control apparatus 20 the reception request signal for requesting the host control apparatus 20 to send the transmission request signal, and the data transmitting/receiving unit 15 (the second communication unit) configured to transmit data to the host control apparatus 20 when the transmission request signal is received and to receive data transmitted from the host control apparatus 20.

The thus configured printing control system 1 according to the first modification example of the embodiment of the present invention transmits normal-event data generated in the printer control apparatus 10 to the host control apparatus 20 when receiving the transmission request signal that is transmitted regularly at a transmission interval set relatively long. The printer control apparatus 10 transmits the reception request signal to the host control apparatus 20 only when anomaly-related data is generated, thereby transmitting the anomaly-related data immediately to the host control apparatus 20. The printing control system 1 according to the first modification example of the embodiment of the present invention is therefore improved in the overall communication efficiency of the system.

In the embodiment of the present invention and in the first modification example of the embodiment of the present invention, the reception request signal transmitted by the printer control apparatus 10 to the host control apparatus 20 through the first communication line 30 is a digital signal that takes one of two values indicative of two states, "high" and "low", depending on the voltage level. The reception request signal may instead take three or more values. For instance, the reception request signal may be a signal that indicates one of three states, "high", "middle", and "low", depending on the voltage level.

In a second modification example of the embodiment of the present invention described below, "high", "middle", and "low" mean that "there is anomaly-related data", "there is only normal-event data", and "there is no transmission data", respectively.

In the case where the reception request signal takes one of the three values described above, the host control apparatus 20 may be configured, for example, so as to immediately send the transmission request signal to the printer control apparatus 10 when receiving the reception request signal that is "high", namely, the signal indicating that "there is anomaly-related data", and, when receiving the reception request signal that is "middle", namely, the signal indicating that "there is only normal-event data", send the transmission request signal to the printer control apparatus 10 after processing that is being executed by the host control apparatus 20, e.g., data transmission processing such as the transmission of printing data, is completed.

In short, when the reception request signal takes three or more values as described above, the level of priority can be expressed by the value of the reception request signal, and the printer control apparatus 10 can issue the reception request signal of a different value for a different level of importance of generated transmission data.

The printing control system 1 and the printer control apparatus 10 according to the second modification example of the embodiment of the present invention are described below with reference to the drawings. A description on components of the second modification example that are common to the embodiment described above is omitted.

Figure 9:
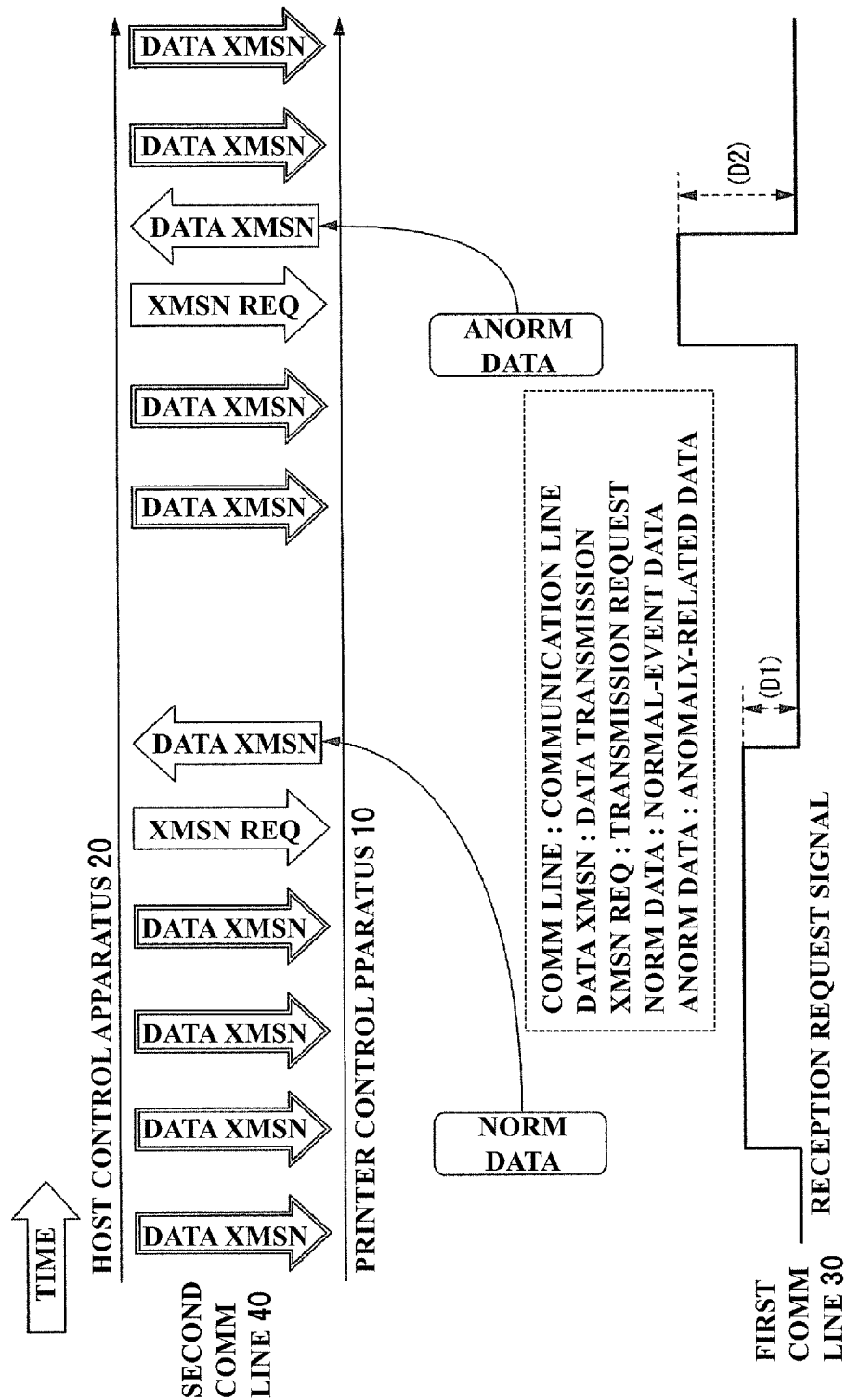
FIG. 9 is a sequence diagram for illustrating an example of the operation of a printing control system according to a second modification example of the embodiment of the present invention.

Described below is the operation of the printing control system according to the second modification example of the embodiment of the present invention. FIG. 9 is a sequence diagram for illustrating an example of the operation of the printing control system according to the second modification example of the embodiment of the present invention. Time flows from the left-hand side of FIG. 9 to the right-hand side of FIG. 9. Operation steps are described below in order from the left-hand side of FIG. 9.

The example of FIG. 9 is a case in which the host control apparatus 20 is executing data transmission to the printer control apparatus 10 through the second communication line 40. The data transmission executed here is, for example, the transmission of printing data. As illustrated, transmission data is generated in the printer control apparatus 10. The first data generated is "normal-event data", which is low in priority. The printer control apparatus 10 accordingly sets the reception request signal to "middle". Specifically, the printer control apparatus 10 transmits the reception request signal that has the value "middle" to the host control apparatus 20 through the first communication line 30. In FIG. 9, a voltage level indicated by the broken line (D1) indicates that the reception request signal being transmitted has the value "middle".

Receiving the reception request signal that has the value "middle", the host control apparatus 20 does not immediately send the transmission request signal to the printer control apparatus 10. The host control apparatus 20 waits for the completion of a series of data transmission processing steps that are being executed by the host control apparatus 20, and then sends the transmission request signal to the printer control apparatus 10 through the second communication line 40. The printer control apparatus 10 receives this transmission request signal and transmits the generated normal-event data to the host control apparatus 20 through the second communication line 40. When the transmission of the normal-event data to the host control apparatus 20 is completed, the printer control apparatus 10 switches the reception request signal from "middle" to "low".

The second transmission data generated in the printer control apparatus 10 is "anomaly-related data", which is high in priority. The printer control apparatus 10 accordingly sets the reception request signal to "high". Specifically, the printer control apparatus 10 transmits the reception request signal that has the value "high" to the host control apparatus 20 through the first communication line 30. In FIG. 9, a voltage level indicated by the broken line (D2) indicates that the reception request signal being transmitted has the value "high".

The host control apparatus 20 receives the "high" reception request signal, which is high in priority, and puts the transmission of the transmission request signal before any other processing that is being executed, for example, processing of transmitting data such as printing data, by immediately sending the transmission request signal to the printer control apparatus 10 through the second communication line 40.

Receiving this transmission request signal, the printer control apparatus 10 transmits the anomaly-related data to the host control apparatus 20 through the second communication line 40. In the manner described above, the printer control apparatus 10 can transmit anomaly-related data to the host control apparatus 20 immediately after the anomaly-related data is generated.

Figure 10:
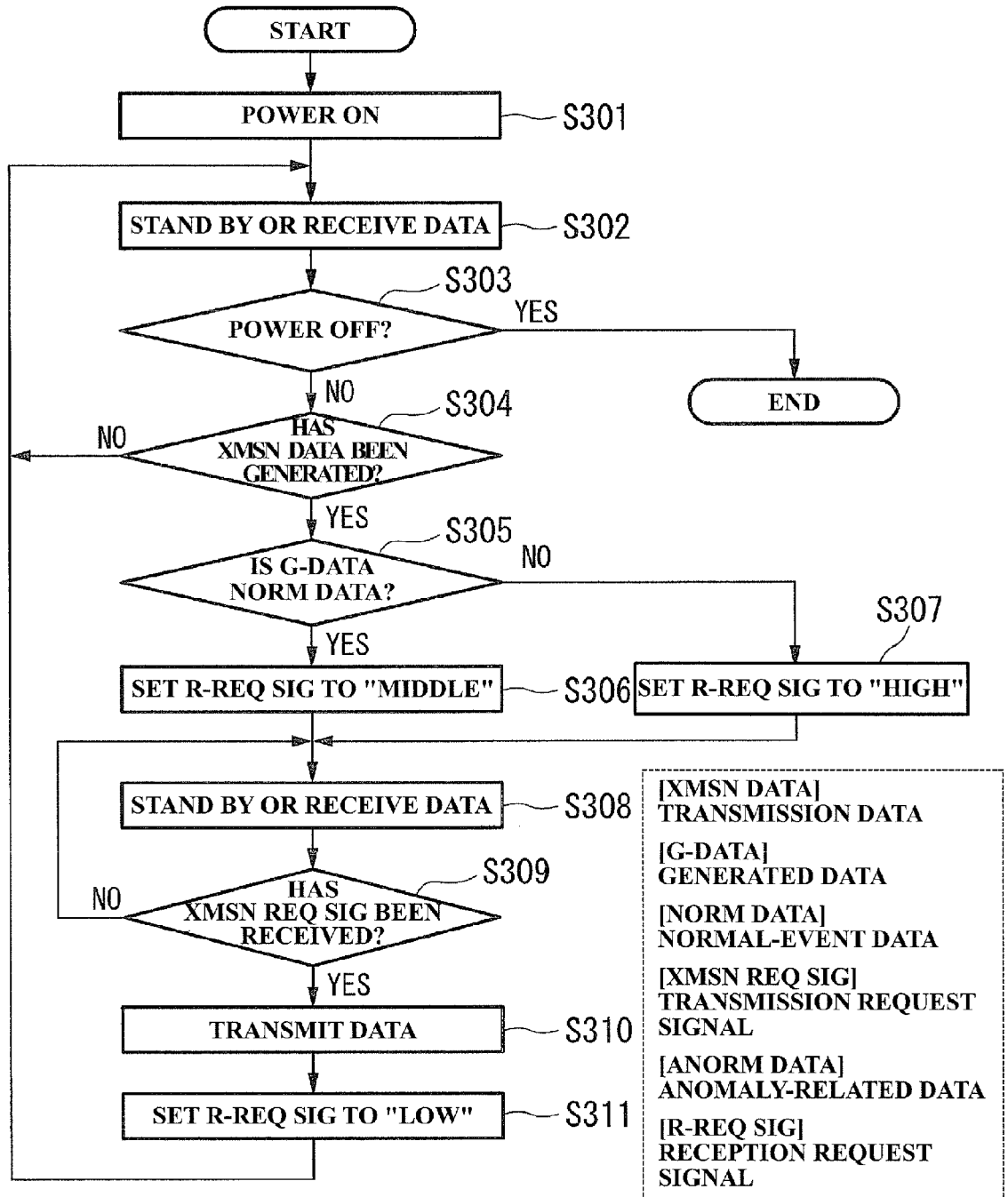
FIG. 10 is a flow chart for illustrating an example of the operation of a printer control apparatus according to the second modification example of the embodiment of the present invention.

The operation of the printer control apparatus 10 according to the second modification example of the embodiment of the present invention is described below. FIG. 10 is a flow chart for illustrating an example of the operation of the printer control apparatus according to the second modification example of the embodiment of the present invention.

(Step S301) First, a printer apparatus including the printer control apparatus 10 is powered on by a user or the like of the printer apparatus. The printer control apparatus 10 then proceeds to Step S302.

(Step S302) The data transmitting/receiving unit 15 of the printer control apparatus 10 stands by to wait for data that is transmitted from the data transmitting/receiving unit 25 of the host control apparatus 20. Alternatively, the data transmitting/receiving unit 15 of the printer control apparatus 10 receives data transmitted from the data transmitting/receiving unit 25 of the host control apparatus 20. The data here is, for example, printing data. The printer control apparatus 10 then proceeds to Step S303.

(Step S303) The operation of this flow chart is ended in the case where the printer apparatus including the printer control apparatus 10 is powered off. Otherwise, the printer control apparatus 10 proceeds to Step S304.

(Step S304) The printer control apparatus 10 proceeds to Step S305 in the case where transmission data to be transmitted to the host control apparatus 20 is generated in the printer control apparatus 10. Otherwise, the printer control apparatus 10 returns to Step S302.

(Step S305) The printer control apparatus 10 proceeds to Step S306 in the case where the transmission data generated in the printer control apparatus 10 is normal-event data. Otherwise, i.e., in the case where the generated transmission data is anomaly-related data, the printer control apparatus 10 proceeds to Step S307.

(Step S306) The controller 12 of the printer control apparatus 10 sets the reception request signal to "middle". Specifically, the signal transmitting unit 14 of the printer control apparatus 10 transmits the reception request signal that has the value "middle" to the signal receiving unit 24 of the host control apparatus 20 through the first communication line 30. The printer control apparatus 10 then proceeds to Step S308.

(Step S307) The controller 12 of the printer control apparatus 10 sets the reception request signal to "high". Specifically, the signal transmitting unit 14 of the printer control apparatus 10 transmits the reception request signal that has the value "high" to the signal receiving unit 24 of the host control apparatus 20 through the first communication line 30. The printer control apparatus 10 then proceeds to Step S308.

(Step S308) The printer control apparatus 10 stands by to wait for data or the transmission request signal that is transmitted from the data transmitting/receiving unit 25 of the host control apparatus 20 through the second communication line 40. Alternatively, the printer control apparatus 10 receives data transmitted from the data transmitting/receiving unit 25 of the host control apparatus 20 through the second communication line 40. The data here is, for example, printing data. The printer control apparatus 10 then proceeds to Step S309.

(Step S309) The printer control apparatus 10 proceeds to Step S310 in the case where the data transmitting/receiving unit 15 of the printer control apparatus 10 receives the transmission request signal from the host control apparatus 20 through the second communication line 40. Otherwise, the printer control apparatus 10 returns to Step S308.

(Step S310) The data transmitting/receiving unit 15 of the printer control apparatus 10 transmits the transmission data to the host control apparatus 20 through the second communication line 40. The printer control apparatus 10 then proceeds to Step S311.

(Step S311) The controller 12 of the printer control apparatus 10 sets the reception request signal to "low". In other words, the printer control apparatus 10 ends the transmission of the reception request signal that has been transmitted by the signal transmitting unit 14 of the printer control apparatus 10 to the host control apparatus 20 through the first communication line 30. The printer control apparatus 10 then returns to Step S302.

As has been described, the host control apparatus 20 in the printing control system 1 according to the second modification example of the embodiment of the present invention does not regularly send the transmission request signal to the printer control apparatus 10 as in the first described embodiment of the present invention. The host control apparatus 20 sends the transmission request signal to the printer control apparatus 10 in response to the reception request signal that is sent from the printer control apparatus 10 only when transmission data is generated in the printer control apparatus 10. The printing control system 1 of the second modification example thus eliminates exchanges in which the host control apparatus 20 sends the transmission request signal even when the transmission data is not generated in the printer control apparatus 10 and the printer control apparatus 10 notifies in response to the request that there is no transmission message. The printing control system 1 according to the second modification example of the embodiment of the present invention is therefore improved in the overall communication efficiency of the system.

While a detailed description has been given above on the embodiment of the present invention, the concrete configuration of the present invention is not limited to the ones described above, and various design modifications and the like can be made without departing from the spirit of the present invention.

A part of or all of the printer control apparatus 10 and the host control apparatus 20 according to the described embodiment may be implemented by a computer. In this case, a program for implementing the control functions thereof may be recorded in a computer-readable recording medium to be read and executed by a computer system.

The "computer system" here is a computer system in which the printer control apparatus 10 and the host control apparatus 20 are built, and which includes an OS and hardware such as peripheral equipment. The "computer-readable recording medium" is a portable medium such as a flexible disk, a magneto-optical disk, a flash memory, an EEPROM, a ROM, a RAM, or a CD-ROM, a storage apparatus built in the computer system such as a hard disk, or a storage medium that is an arbitrary combination of those portable media and storage apparatus.

Examples of the "computer-readable recording medium" may also include a medium that holds the program dynamically for a short length of time, such as the Internet or a similar communication network or a phone line or a similar communication line through which the program is transmitted, and a medium that holds the program for a predetermined length of time, such as a volatile memory inside the computer system that serves as a server or a client when the program is transmitted over a communication network or a communication line. The program may be one that implements some of the functions described above, or may implement the described functions in combination with a program that is already recorded in the computer system.

Alternatively, a part of or all of the printer control apparatus 10 and the host control apparatus 20 in the embodiment described above may be implemented in the form of an integrated circuit such as a large-scale integration (LSI) circuit. The function blocks of the printer control apparatus 10 and the host control apparatus 20 may be made into processors individually, or some or all of the function blocks may be integrated into a processor. The method of integration is not limited to LSI, and the integration may be accomplished with the use of a dedicated circuit or a general-purpose processor. If a future advance of semiconductor technology produces integration technology that can substitute for LSI, an integrated circuit according to this integration technology may be used.

What is claimed is:

1. A printer control apparatus comprising:
   a first communication unit configured to generate data including printing data to be transmitted from a printer control apparatus to a host control apparatus and transmit to the host control apparatus a reception request signal, which is for prompting the host control apparatus to transmit a transmission request signal upon receipt of the reception request signal; and
   a second communication unit configured to transmit to the host control apparatus, the data including printing data, when receiving the transmission request signal;
   wherein the first communication unit comprises a signal transmitting unit and a first communication line, and the second communication unit comprises a data transmitting/receiving unit and a second communication line.

2. A printer control apparatus according to claim 1, wherein
   the data including printing data further comprises other types of data which is classified to be high priority data and low priority data; and
   the first communication unit transmits the reception request signal to the host control apparatus only when the high priority data is to be transmitted to the host control apparatus.

3. A printer control apparatus according to claim 1, wherein
   the reception request signal indicates a priority level of the data, and
   upon receipt of the transmission request signal, the second communication unit transmits to the host control apparatus the data that has the priority level indicated by the reception request signal.

4. A printer control apparatus according to claim 2, wherein
   the reception request signal indicates a priority level of the data, and
   the second communication unit transmits to the host control apparatus the data that has the priority level indicated by the reception request signal.

5. A printing control method to be used in a printer control apparatus, the printing control method including:
   generating data including printing data to be transmitted from a printer control apparatus to a host control apparatus;
   upon generation of the data including printing data, transmitting, from the printer control apparatus to the host control apparatus, through a first transmission line, a reception request signal, which is for prompting the host control apparatus to transmit a transmission request signal upon receipt of the reception request signal;
   receiving, through a second transmission line which is different from the first transmission line, a transmission request signal, from the host control apparatus;
   transmitting, through the second transmission line, the data including printing data, to the host control apparatus when the printer control apparatus receives the transmission request signal.

6. A printing control system, including a printer control apparatus and a host control apparatus,
   the printer control apparatus including:
      a first communication unit configured to generate data including printing data to be transmitted from the printer control apparatus to the host control apparatus and transmit to the host control apparatus a reception request signal, which is for prompting the host control apparatus to transmit a transmission request signal upon receipt of the reception request signal; and
      a second communication unit configured to transmit, the data including printing data, to the host control apparatus when receiving the transmission request signal,
      wherein the first communication unit comprises a signal transmitting unit and a first communication line and the second communication unit comprises a first data transmitting/receiving unit and a second communication line;
   the host control apparatus including:
      a third communication unit configured to receive the reception request signal; and
      a fourth communication unit configured to, when receiving the reception request signal, transmit the transmission request signal, which is for prompting the printer control apparatus to transmit the data;
      wherein the third communication unit comprises a signal receiving unit and the first communication line and the fourth communication unit comprises a second data transmitting/receiving unit and the second communication line.

* * * * *